(12) United States Patent
Chen

(10) Patent No.: US 7,600,151 B2
(45) Date of Patent: Oct. 6, 2009

(54) RAID CAPACITY EXPANSION INTERRUPTION RECOVERY HANDLING METHOD AND SYSTEM

(75) Inventor: Chih-Wei Chen, Taipei (TW)

(73) Assignee: Inventec Corporation, Taipei (TW)

( * ) Notice: Subject to any disclaimer, the term of this patent is extended or adjusted under 35 U.S.C. 154(b) by 430 days.

(21) Appl. No.: 11/698,573

(22) Filed: Jan. 25, 2007

(65) Prior Publication Data

US 2008/0184070 A1  Jul. 31, 2008

(51) Int. Cl.
 *G06F 11/00* (2006.01)
(52) U.S. Cl. .......................................................... 714/8
(58) Field of Classification Search ................... 714/5–8
 See application file for complete search history.

(56) References Cited

U.S. PATENT DOCUMENTS

| | | | | |
|---|---|---|---|---|
| 6,058,489 | A | * | 5/2000 | Schultz et al. ................. 714/7 |
| 2005/0166085 | A1 | * | 7/2005 | Thompson et al. ............. 714/6 |
| 2007/0174577 | A1 | * | 7/2007 | Moir et al. .................. 711/170 |
| 2009/0094427 | A1 | * | 4/2009 | Sano ........................... 711/162 |

* cited by examiner

*Primary Examiner*—Bryce P Bonzo
(74) *Attorney, Agent, or Firm*—Peter F. Corless; Steven M. Jensen; Edwards Angell Palmer & Dodge LLP

(57) ABSTRACT

A RAID capacity expansion interruption recovery handling method and system is proposed, which is designed for use with a RAID (Redundant Array of Independent Disks) unit for providing a capacity-expansion interruption recovery function that allows the RAID unit to recover after an event of an unexpected interruption to a capacity-expansion procedure that builds data from an original disk set to a newly-added disk. The proposed method and system is characterized by the capability of continuously recording the addresses of blocks that have been rebuilt in the original disk set and the newly-added disk to a permanent storage medium, such that in the event of any unexpected interruption, the address of the last block that has been rebuilt can be stored as a checkpoint. After the RAID unit is reset, the checkpoint can then be used as a recovery point for the uncompleted capacity expansion procedure without having to restart all over again from the beginning point. This feature allows the recovery of capacity expansion after unexpected interruption to be carried out more efficiently with enhanced system performance.

8 Claims, 3 Drawing Sheets

RAID CAPACITY EXPANSION INTERRUPTION RECOVERY HANDLING METHOD AND SYSTEM

BACKGROUND OF THE INVENTION

1. Field of the Invention

This invention relates to information technology (IT), and more particularly, to a RAID capacity expansion interruption recovery handling method and system which is designed for use by a disk array unit, such as a RAID (Redundant Array of Independent Disks) unit, for providing the RAID unit with a recovery handling function in response to an event of abnormal interruption to an capacity expansion procedure on the RAID unit.

2. Description of Related Art

RAID (Redundant Array of Independent Disks) is a multi-disk storage unit that contains two or more hard disks for providing a very large data storage capacity. A RAID unit is commonly connected in a network system to one or more servers for these servers to store the large amount of data that flow through the network system. Since a RAID unit contains a cluster of independent disks, it allows an interleaved access method that can significantly enhance data access speed, as well as providing a multiple backup function that allows the storage of data to be highly reliable and secured.

In actual applications, the multiple disks of a RAID unit are grouped into one or more clusters, each cluster being used for serving a specific storage purpose, such as email server storage or file server storage. When the network management personnel wants to expand the total capacity of the RAID unit, a new disk can be added to the RAID unit. This task is customarily referred to as a capacity expansion procedure. After the new disk is installed, it requires a set of configuration data about the RAID unit (such as the superblock data) to be duplicated to the newly-added disk.

In practice, however, during the proceeding of the capacity expansion procedure, abnormal power shutoff might occur to the RAID unit, causing the capacity expansion procedure to be abnormally interrupted. In this case, when electrical power is resumed to the RAID unit, the abnormally-interrupted capacity expansion procedure should be started over all again from the very beginning, and not from the checkpoint where the interruption occurred. For this sake, when abnormal interruption occurs to the capacity expansion procedure, the previous process time spent on the abnormally-interrupted capacity expansion procedure is entirely wasted, which would significantly degrade the overall network system performance and serviceability.

SUMMARY OF THE INVENTION

It is therefore an objective of this invention to provide a RAID capacity expansion interruption recovery handling method and system which allows an abnormally-interrupted capacity expansion procedure to be recovered by starting from the checkpoint of the interruption without having to start all over again from the very beginning.

It is another objective of this invention to provide a RAID capacity expansion interruption recovery handling method and system which can help ensure overall network system performance and serviceability.

The RAID capacity expansion interruption recovery handling method according to the invention comprises the following operations: (M1) during the runtime of the capacity expansion procedure, recording the proceeding status of the capacity expansion procedure and storing the recorded data into a predefined capacity-expansion status table module; (M2) in the event of an abnormal interruption to the capacity expansion procedure, responding to a restarting event on the computer platform by checking whether the capacity-expansion status table module records the status of an abnormally-interrupted capacity expansion procedure; if yes, issuing a recovery enable message; (M3) responding to the recovery enable message by determining a recovery point based on the checkpoint data about the abnormally-interrupted capacity expansion procedure retrieved from the capacity-expansion status table module; and (M4) performing a recovery on the abnormally-interrupted capacity expansion procedure by starting from the recovery point determined by the recovery point determining module.

In architecture, the RAID capacity expansion interruption recovery handling system according to the invention comprises the following components: (A) a capacity-expansion status table module, which is stored in a permanent storage medium for recording the proceeding status of the capacity expansion procedure, including the address of each expanded block in the disk cluster and the address of each expanded block in the newly-added disk for use as a checkpoint in the event of abnormal interruption to the capacity expansion procedure; (B) a capacity-expansion status recording module, which is capable of being activated during the runtime of the capacity expansion procedure by recording the proceeding status of the capacity expansion procedure and storing the recorded data into the capacity-expansion status table module; (C) a recovery activation module, which is capable of responding to each restarting event on the computer platform by checking whether the capacity-expansion status table module records the status of an abnormally-interrupted capacity expansion procedure; and if yes, capable of issuing a recovery enable message; (D) a recovery point determining module, which is capable of responding to the recovery enable message from the recovery activation module by determining a recovery point based on the checkpoint data about the abnormally-interrupted capacity expansion procedure retrieved from the capacity-expansion status table module; and (E) a capacity expansion recovery module, which is capable of performing a recovery on the abnormally-interrupted capacity expansion procedure by starting from the recovery point determined by the recovery point determining module.

The RAID capacity expansion interruption recovery handling method and system according to the invention is characterized by the capability of continuously recording the addresses of blocks that have been rebuilt in the original disk set and the newly-added disk to a permanent storage medium, such that in the event of any unexpected interruption, the address of the last block that has been rebuilt can be stored as a checkpoint. After the RAID unit is reset, the checkpoint can then be used as a recovery point for the uncompleted capacity expansion procedure without having to restart all over again from the beginning point. This feature allows the recovery of capacity expansion after unexpected interruption to be carried out more efficiently with enhanced system performance.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The RAID capacity expansion interruption recovery handling method and system according to the invention is disclosed in full details by way of preferred embodiments in the following with reference to the accompanying drawings.

Figure 1:
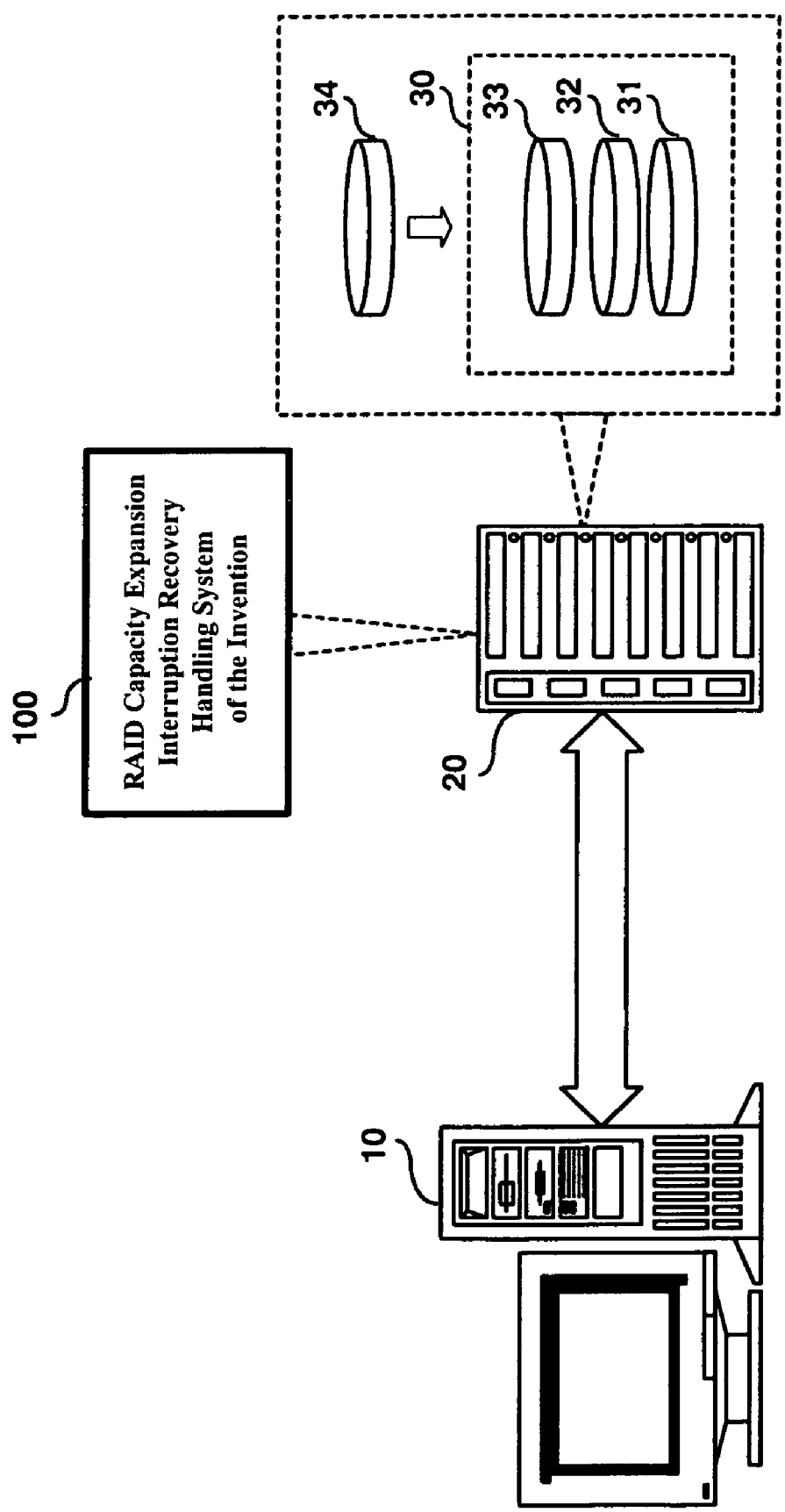
FIG. 1 is a schematic diagram showing the application of the RAID capacity expansion interruption recovery handling system of the invention.

FIG. 1 is a schematic diagram showing the application of the RAID capacity expansion interruption recovery handling system according to the invention (as the part encapsulated in the box indicated by the reference numeral 100). As shown, the RAID capacity expansion interruption recovery handling system of the invention 100 is designed for use by a computer platform 10, such as a network server, that is equipped with a disk array unit, such as a RAID (Redundant Array of Independent Disks) unit 20. In operation, the RAID capacity expansion interruption recovery handling system of the invention 100 is capable of providing the RAID unit 20 with a recovery handling function in response to an event of abnormal interruption (such as caused by abnormal power shutoff) to a capacity expansion procedure on the RAID unit 20, so that the recovered capacity expansion procedure can start from the checkpoint of the interruption.

In the embodiment of FIG. 1, it is assumed that the RAID unit 20 includes a disk cluster 30 (in the example of the FIG. 1, the disk cluster 30 contains 3 disks 31, 32, 33; but in practice, there is no restriction to the number of the disks). It is assumed that network management personnel wants to add a new disk 34 to the disk cluster 30 for increasing the total capacity of the RAID unit 20, and thus initiates a capacity expansion procedure on the RAID unit 20. In this case, if the capacity expansion procedure is abnormally interrupted before successfully completed, then after electrical power is resumed, the RAID capacity expansion interruption recovery handling system of the invention 100 will be automatically activated at the restart of the computer platform 10 to perform a recovery procedure for the abnormally-interrupted capacity expansion procedure by starting from the checkpoint of the interruption without having to start all over again from the very beginning.

Figure 2:
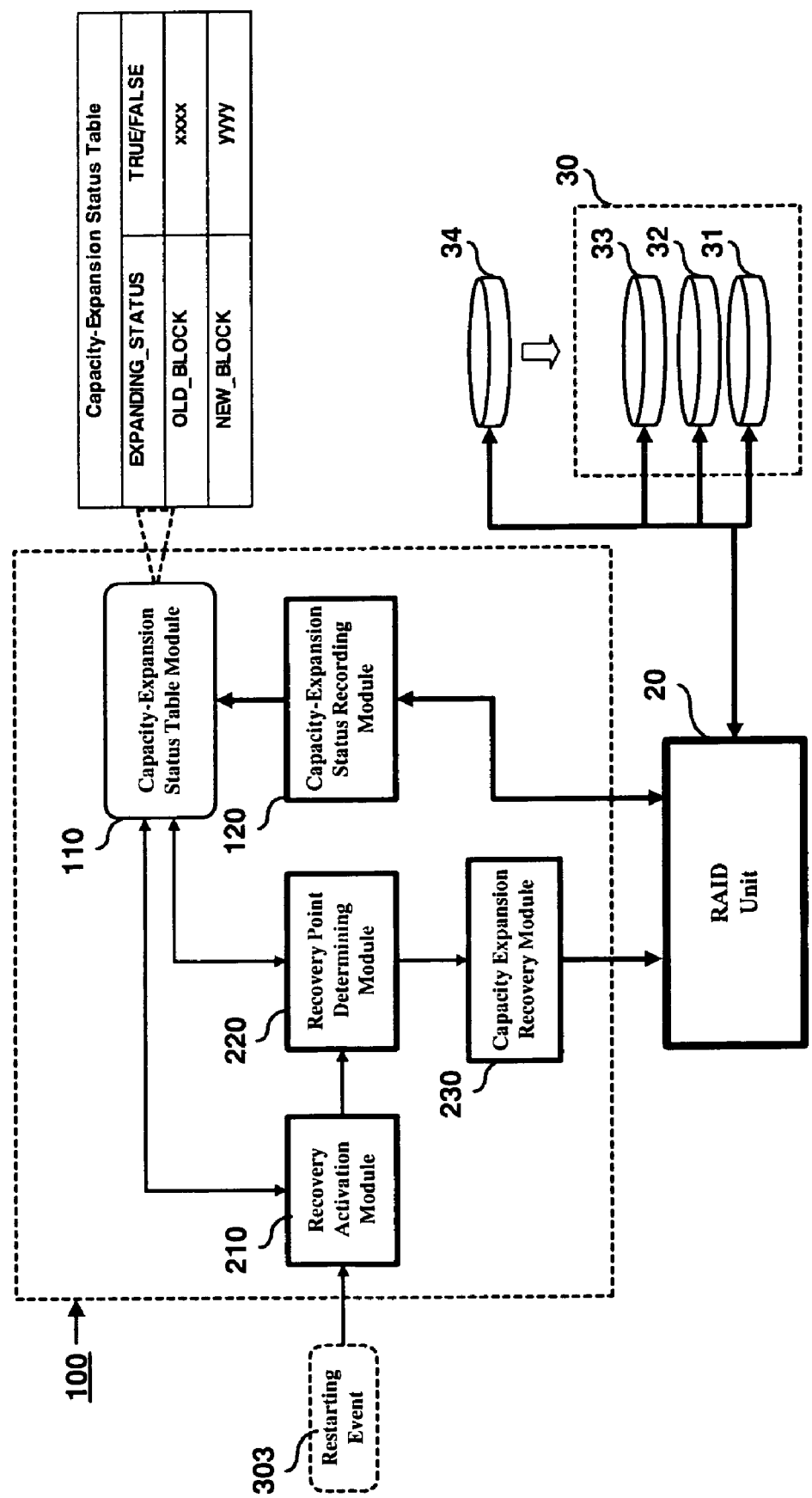
FIG. 2 is a schematic diagram showing a modularized architecture of the RAID capacity expansion interruption recovery handling system of the invention.

As shown in FIG. 2, the RAID capacity expansion interruption recovery handling system of the invention 100 is based on a modularized architecture which comprises: (A) a capacity-expansion status table module 110; (B) a capacity-expansion status recording module 120; (C) a recovery activation module 210; (D) a recovery point determining module 220; and (E) a capacity expansion recovery module 230. Firstly, the respective attributes and behaviors of these constituent modules are described in details in the following.

The capacity-expansion status table module 110 is a data-only module, which is implemented with a table constructed on a permanent storage medium, such as the superblock on the disks 31, 32, 33 of the RAID unit 20. As shown in FIG. 2, the capacity-expansion status table module 110 includes an [EXPANDING_STATUS] field, an [OLD_BLOCK] field, and a [NEW_BLOCK] field. The [EXPANDING_STATUS] field is used to set a TRUE/FALSE value, wherein a TRUE value indicates that a capacity expansion procedure is currently in process but uncompleted yet, whereas a FALSE value indicates that no capacity expansion procedure is currently in process or a previously-activated one has completed. The [OLD_BLOCK] field is used to record the address of each expanded block in the disk cluster 30 right after the completion of the expansion on that block; and similarly, the [NEW_BLOCK] field is used to record the address of each expanded block in the newly-added disk 34 right after the completion of the expansion on that block.

The capacity-expansion status recording module 120 is capable of being activated in response to each start of a capacity expansion procedure on the RAID unit 20, and when activated, is capable of recording the proceeding status of the capacity expansion procedure (i.e., the address of each expanded block in the disk cluster 30 and the newly-added disk 34 right after the completion of the expansion on that block) and storing the recorded address values into the corresponding fields (i.e., the [OLD_BLOCK] field and the [NEW_BLOCK] field) in the capacity-expansion status table module 110.

The recovery activation module 210 is capable of responding to each restarting event 303 on the computer platform 10 (i.e., when power is resumed to the computer platform 10 after abnormal power shutoff) by checking whether the capacity-expansion status table module 110 records a previously-started but abnormally-interrupted capacity expansion procedure (i.e., whether the [EXPANDING_STATUS] field currently records a TRUE value or a FALSE value). If [EXPANDING_STATUS]=FALSE, it indicates that no capacity expansion procedure was previously abnormally interrupted; whereas if [EXPANDING_STATUS]=TRUE, it indicates that a previously-started capacity expansion procedure was abnormally interrupted due to abnormal power shutoff or other causes, and consequently, a recovery enable message is issued to the recovery point determining module 220.

The recovery point determining module 220 is capable of responding to the recovery enable message from the recovery activation module 210 by first retrieving the checkpoint data about the abnormally-interrupted capacity expansion procedure from the capacity-expansion status table module 110, i.e., the address data currently stored in the [OLD_BLOCK] field and [NEW_BLOCK] field. These address data indicate the checkpoint of the abnormal interruption, i.e., the address of the last successfully-expanded block in the disk cluster 30 and the newly-added disk 34 during the proceeding of the abnormally-interrupted capacity expansion procedure. Therefore, based on these address data, the recovery point determining module 220 can determine the starting address of unexpanded blocks in the disk cluster 30 and the starting address of unexpanded blocks in the newly-added disk 34 by increasing the [OLD_BLOCK] value and the [NEW_BLOCK] value by one. The result is then used as a recovery point for resuming the abnormally-interrupted capacity expansion procedure.

The capacity expansion recovery module 230 is capable of performing a recovery on the abnormally-interrupted capacity expansion procedure by starting from the recovery point determined by the recovery point determining module 220 (i.e., from the first address of unexpanded blocks in the disk cluster 30 and newly-added disk 34). If the resumed capacity expansion procedure proceeds smoothly without being interrupted until successfully completed, the capacity expansion recovery module 230 will set the [EXPANDING_STATUS] field in the capacity-expansion status table module 110 to "FALSE".

Figure 3:
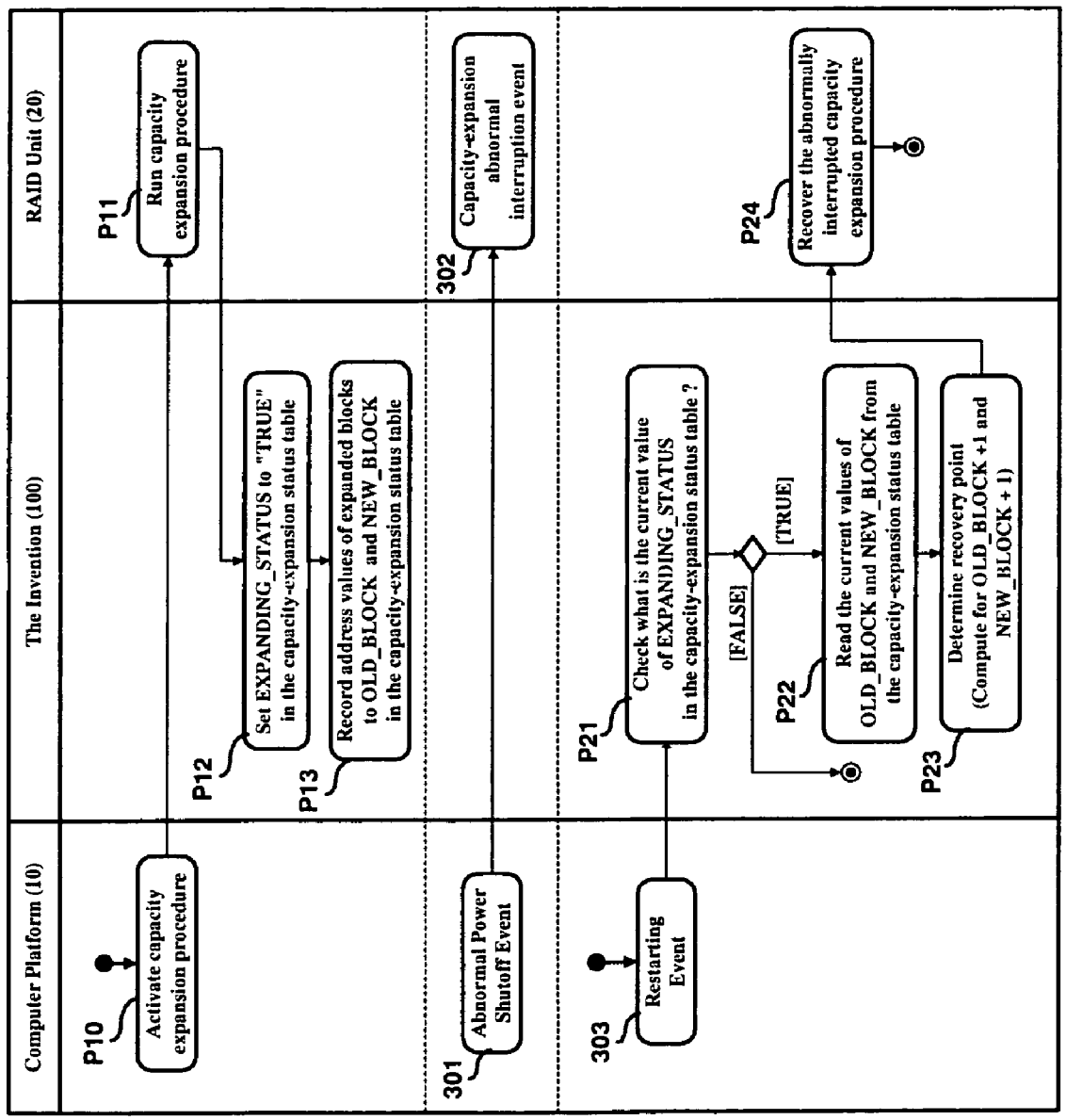
FIG. 3 is an activity diagram showing the activities performed by the RAID capacity expansion interruption recovery handling system of the invention.

The following is a detailed description of a practical application example of the RAID capacity expansion interruption recovery handling system of the invention 100 during actual operation, with reference to FIG. 3.

Referring to FIG. 1 through FIG. 3, it is assumed that the network management personnel wants to add a new disk 34 to the disk cluster 30 to expand the total capacity of the RAID unit 20. The network management personnel first uses the computer platform 10 to initiate a capacity expansion procedure (as the activity P10 shown in FIG. 3), which causes the RAID unit 20 to perform a capacity expansion procedure (as the activity P11 shown in FIG. 3). During the proceeding of the capacity expansion procedure, the capacity-expansion status recording module 120 is activated to record the proceeding status of the capacity expansion procedure, i.e., set the [EXPANDING_STATUS] field in the capacity-expansion status table module 110 to "TRUE" (as the activity P12 shown in FIG. 3), and meanwhile successively record the address of each expanded block in the disk cluster 30 and the newly-added disk 34 right after the completion of the expansion on that block) respectively into the [OLD_BLOCK] field and the [NEW_BLOCK] field of the capacity-expansion status table module 110.

During the proceeding of the capacity expansion procedure, if an abnormal power shutoff event 301 occurs on the computer platform 10, it will cause a capacity-expansion abnormal interruption event 302 on the RAID unit 20. However, the capacity-expansion status table module 110 (which resides on the superblock of the disks 31, 32, 33) will permanently set the [EXPANDING_STATUS] field with a TRUE value, the [OLD_BLOCK] field with the address of the last-successfully expanded block in the disk cluster 30, and the [NEW_BLOCK] field with the address of the last-successfully expanded block in the newly-added disk 34.

Subsequently, when electrical power is resumed to the computer platform 10 (i.e., at the occurrence of a restarting event 303 on the computer platform 10), it will activate the recovery activation module 210 to check whether the [EXPANDING_STATUS] field currently record a TRUE value (as the activity P21 shown in FIG. 3); if YES, it indicates that a capacity expansion procedure was previously in progress but uncompleted due to abnormal interruption. Consequently, the recovery point determining module 220 is activated to read the [OLD_BLOCK] field and the [NEW_BLOCK] field of the capacity-expansion status table module 110 for the address values of the last-successfully expanded block in the disk cluster 30 and the newly-added disk 34 (as the activity P22 shown in FIG. 3); and then based on these data, the recovery point determining module 220 determines the starting address of unexpanded blocks in the disk cluster 30 and the starting address of unexpanded blocks in the newly-added disk 34 by increasing the [OLD_BLOCK] value and the [NEW_BLOCK] value by one (as the activity P23 shown in FIG. 3). The determined starting address values are then used as a recovery point. Subsequently, the capacity expansion recovery module 230 is activated to performing a recovery on the abnormally-interrupted capacity expansion procedure on the RAID unit 20 that reruns the abnormally-interrupted capacity expansion procedure by starting from the recovery point determined by the recovery point determining module 220 (as the activity P24 shown in FIG. 3). If the capacity expansion recovery procedure proceeds smoothly without being interrupted until successfully completed, the capacity expansion recovery module 230 will set the [EXPANDING_STATUS] field in the capacity-expansion status table module 110 to "FALSE".

In conclusion, the invention provides a RAID capacity expansion interruption recovery handling method and system which is designed for use with a RAID unit for providing a capacity-expansion interruption recovery function that allows the RAID unit to recover after an event of an unexpected interruption to a capacity-expansion procedure that builds data from an original disk set to a newly-added disk. The proposed method and system is characterized by the capability of continuously recording the addresses of blocks that have been rebuilt in the original disk set and the newly-added disk to a permanent storage medium, such that in the event of any unexpected interruption, the address of the last block that has been rebuilt can be stored as a checkpoint. After the RAID unit is reset, the checkpoint can then be used as a recovery point for the uncompleted capacity expansion procedure without having to restart all over again from the beginning point. This feature allows the recovery of capacity expansion after unexpected interruption to be carried out more efficiently with enhanced system performance. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A disk array unit capacity expansion interruption recovery handling method for use by a computer platform that is equipped with a disk array unit having a cluster of disks and capable of performing a capacity expansion procedure to add a new disk to the disk cluster, for the purpose of providing the disk array unit with a recovery handling function in the event of an abnormal interruption to the capacity expansion procedure;

the disk array unit capacity expansion interruption recovery handling method comprising:

during the runtime of the capacity expansion procedure, recording the proceeding status of the capacity expansion procedure and storing the recorded data into a predefined capacity-expansion status table module;

in the event of an abnormal interruption to the capacity expansion procedure, responding to a restarting event on the computer platform by checking whether the capacity-expansion status table module records the status of an abnormally-interrupted capacity expansion procedure; if yes, issuing a recovery enable message;

responding to the recovery enable message by determining a recovery point based on the checkpoint data about the abnormally-interrupted capacity expansion procedure retrieved from the capacity-expansion status table module; and performing a recovery on the abnormally-interrupted capacity expansion procedure by starting from the recovery point determined by the recovery point determining module.

2. The disk array unit capacity expansion interruption recovery handling method of claim 1, wherein the computer platform is a network server.

3. The disk array unit capacity expansion interruption recovery handling method of claim 1, wherein the disk array unit is a RAID (Redundant Array of Independent Disks) compliant unit.

4. The disk array unit capacity expansion interruption recovery handling method of claim 1, wherein the disk array unit's storage area includes a superblock on which the capacity-expansion status table module is stored.

5. A disk array unit capacity expansion interruption recovery handling system for use by a computer platform that is equipped with a disk array unit having a cluster of disks and capable of performing a capacity expansion procedure by adding a new disk to the disk cluster, for the purpose of providing the disk array unit with a recovery handling function in the event of abnormal interruption to the capacity expansion procedure;

the disk array unit capacity expansion interruption recovery handling system comprising:

a capacity-expansion status table module, which is stored in a permanent storage medium for recording the proceeding status of the capacity expansion procedure, including the address of each expanded block in the disk cluster and the address of each expanded block in the newly-added disk for use as a checkpoint in the event of abnormal interruption to the capacity expansion procedure;

a capacity-expansion status recording module, which is capable of being activated during the runtime of the capacity expansion procedure by recording the proceeding status of the capacity expansion procedure and storing the recorded data into the capacity-expansion status table module;

a recovery activation module, which is capable of responding to each restarting event on the computer platform by checking whether the capacity-expansion status table module records the status of an abnormally-interrupted capacity expansion procedure; and if yes, capable of issuing a recovery enable message;

a recovery point determining module, which is capable of responding to the recovery enable message from the recovery activation module by determining a recovery point based on the checkpoint data about the abnormally-interrupted capacity expansion procedure retrieved from the capacity-expansion status table module; and a capacity expansion recovery module, which is capable of performing a recovery on the abnormally-interrupted capacity expansion procedure by starting from the recovery point determined by the recovery point determining module.

6. The disk array unit capacity expansion interruption recovery handling system of claim 5, wherein the computer platform is a network server.

7. The disk array unit capacity expansion interruption recovery handling system of claim 5, wherein the disk array unit is a RAID (Redundant Array of Independent Disks) compliant unit.

8. The disk array unit capacity expansion interruption recovery handling system of claim 5, wherein the disk array unit's storage area includes a superblock on which the capacity-expansion status table module is stored.

* * * * *